March 27, 1962 H. PRATER, JR 3,026,872
HYPODERMIC SYRINGE
Filed May 17, 1952
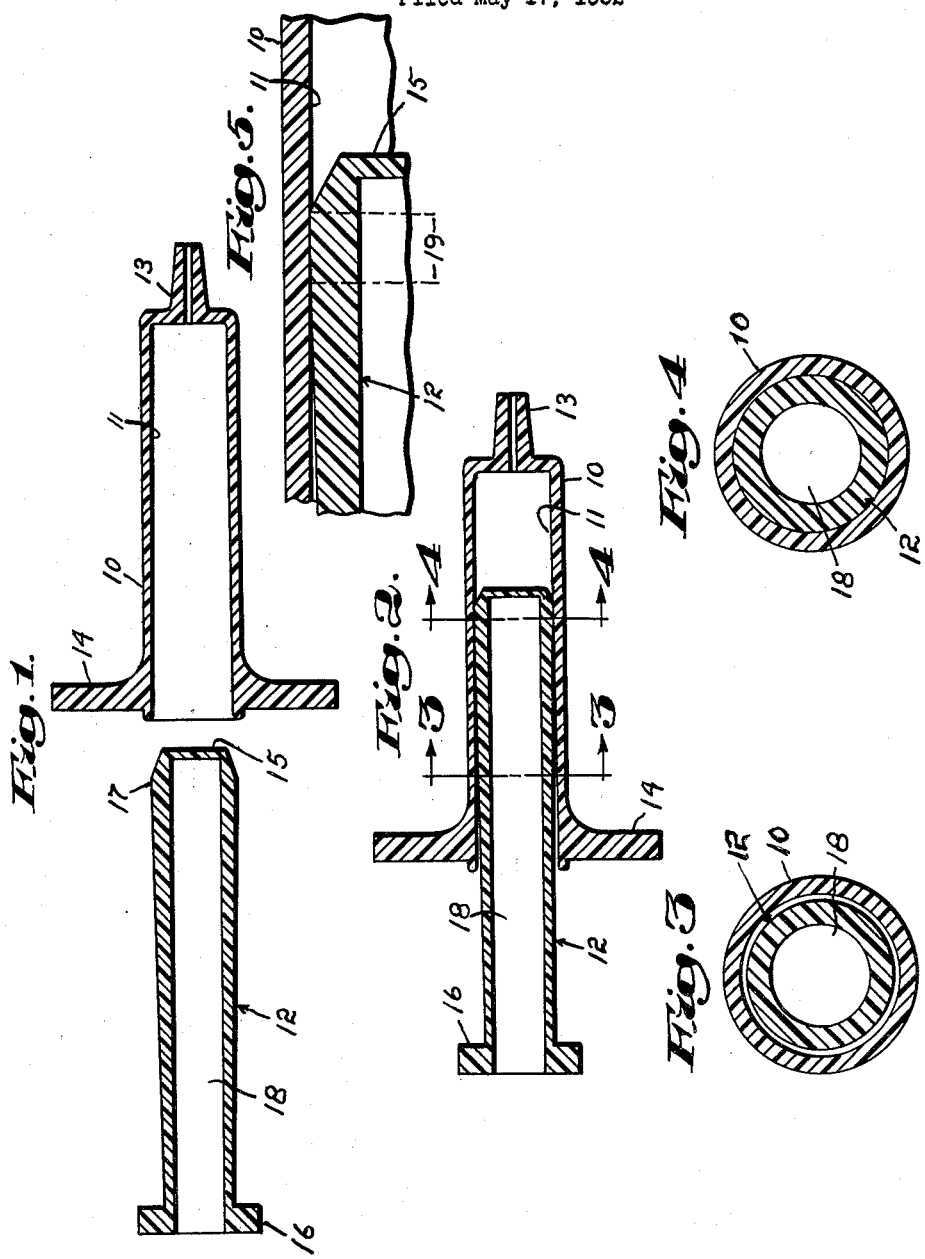
Inventor:
Harlan Prater Jr.
by Abbott Lynn
Attorney

United States Patent Office 3,026,872
Patented Mar. 27, 1962

3,026,872
HYPODERMIC SYRINGE
Harlan Prater, Jr., Wellesley Hills, Mass., assignor, by mesne assignments, to American Cyanamid Company, New York, N.Y., a corporation of Maine
Filed May 17, 1952, Ser. No. 288,510
5 Claims. (Cl. 128—218)

This invention relates to hypodermic and like syringes and particularly to such syringes made at least in part from a plastic.

Glass hypodermic syringes, having a ground fit between the bores of their barrels and their plungers, have established standards as to ease of operation and resistance to back leakage under relatively high pressures. The objectionable feature that the glass parts are both easily broken and costly to produce has lead to the production of syringes of different construction and from different materials.

Where the use of plastics is resorted to, the problem is to provide a hypodermic syringe combining, on the one hand, tightness and ease of operation and, on the other hand, a sufficiently low production cost to make it economical to discard a syringe after a single use.

While the invention is discussed primarily in connection with so-called "disposable" hypodermic syringes, it is equally adapted for syringes that are intended for re-use. The principal difference resides in the particular plastic or plastics used for some are incapable of withstanding sterilizing temperatures while others are not suitable for disposable use because of their cost.

In accordance with the invention, a syringe comprises a barrel having a bore and a plunger to enter that bore. The distal end of the plunger is dimensioned to fit freely in the bore and the plunger includes, adjacent that end, an annular sealing portion of greater diameter than the major portion of the bore. In this area, the plunger is preferably hollow and is of resiliently yieldable stock. A relative taper between the bore and the remainder of the barrel entering part of the plunger prevents contact therebetween and establishes the annular sealing portion as a ridge that is resistant to being axially upset but is readily compressed with such compression being attended by an appreciable elongation of the seal to provide an adequate bearing for the plunger. The relative taper may be established by forming the plunger, rearwardly of the sealing portion, with a rearward and inward taper, the bore of the barrel with a forward and inward taper, or both.

While various materials may be used in the manufacture of syringes in accordance with the invention, it is necessary that the barrel be sufficiently rigid to effect compression of the sealing portion of the piston without itself being distorted and it is also essential that the sealing portion of the plunger offer minimum resistance to axial movement of the piston to combine tightness with smoothness and ease of operation.

The plunger or at least its sealing portion may be formed from any plastic having anti-friction qualities in the order of those of polyethylene, silicones, or silicone-coated plastics. While the compressibility and elasticity of the material from which the plunger or its sealing portion is important, these qualities are to some extent dependent on the accuracy with which the bore of the barrel is formed. The particular plastic or plastics used is obviously dependent on whether they are susceptible to attack by the medicament or drug to be used and also on their ability to withstand sterilizing temperatures. For example, polyethylene is admirably adapted for use in making plungers for syringes to be discarded after a single use even though it is not adapted to withstand prolonged exposure to heat appreciably in excess of 100° C.

In the accompanying drawings, there is shown an illustrative embodiment of the invention from which its several novel features and advantages will be apparent.

In the drawings:

FIG. 1 is a view showing the plunger and the barrel longitudinally sectioned and assembled, FIG. 2 is a similar view of the assembled syringe.

FIGS. 3 and 4 are sections, on an enlarged scale, along the indicated lines 3—3 and 4—4, respectively, of FIG. 2, and FIG. 5 is a fragmentary longitudinal section, on a substantially increased scale, showing the sealing portion of the plunger compressed and elongated by the barrel.

In the embodiment of the invention shown in the drawings, the barrel 10 is provided with a bore 11 to receive the plunger, generally indicated at 12. At its distal end, the barrel 10 is shown as having a bored tip 13 to receive the hub, not shown, of a hypodermic needle. At its other end, the barrel 10 has oppositely disposed finger engaging flanges 14. The bore 11 has a slight forward and inward taper as will be apparent from FIGURE 1.

The plunger 12 is shown as tapering forwardly and inwardly to provide a distal end 15 dimensioned to fit freely within the bore 10 and rearwardly and inwardly towards the thumb flange 16 to establish an annular sealing ridge 17, adjacent the distal end 15, which is of greater diameter than the bore 11 and to ensure that the remainder of the barrel entering part of the plunger does not engage with the bore.

The plunger 12 is shown as molded in one piece, although it may be molded in two or more pieces, and provided with an axial cavity 18 opening through its flanged end and traversing the zone of the ridge 17. The stock from which the plunger 12 is molded is yieldably resilient and is compressed as it enters the bore 11 to effect a tight seal between the plunger and the barrel without making the plunger difficult to operate. During such compression an elongated bearing is effected as indicated at 19 in FIG. 5. The compressibility of the ridge 17 is materially assisted by the cavity 18. When the bore 11 is tapered, that taper effects increased compression on the ridge 17 as the plunger is advanced in the barrel and such a taper may be utilized by itself to effect the ridge defining taper between the barrel and plunger or the compression of the ridge 17 regardless of the plunger construction.

It will be noted that the ridge 17, while terminating in a crest, is dimensioned to resist being axially upset as the plunger 12 is reciprocated and this is an essential requirement of syringes in accordance with the invention.

While the barrel 10 may be made from a wide range of materials, Lucite, glass, polystyrene and nylon are satisfactory. The plunger 12 must be resiliently yieldable, at least in the zone of the ridge 17, to ensure a tight seal between the barrel and plunger. For the barrels of disposable syringes, polyethylene has proved satisfactory. For plungers capable of withstanding a higher temperature than the range for which polyethylene is suited, silicone or silicone-coated plastics may be used. These or their equivalents have the important characteristics of being "slippery" and this anti-friction factor ensures smoothness and ease of operation with a tight seal established by a cylindrical bearing of substantial length.

What I therefore claim and desire to secure by Letters Patent is:

1. A hypodermic syringe comprising a barrel having a bore tapering inwardly towards the distal end thereof and a plunger reciprocable in said bore and having an axial cavity opening towards its proximal end, said plunger being of resiliently yieldable stock and tapering towards both of its ends to provide an annular ridge whose crest portion is adjacent said distal end and having a diameter greater than that of the major portion of said bore and dimensioned with its base materially greater than its height thus to resist being axially upset in plunger reciprocation, the crest being compressed on insertion into that portion of the bore into an axially lengthened bearing portion, the remainder of said plunger being out of contact with said barrel.

2. A hypodermic syringe comprising a barrel having a bore and a plunger reciprocable in said bore and having an axial cavity opening towards its proximal end, said plunger being of resiliently yieldable stock and tapering towards both of its ends to provide an annular ridge whose crest portion is adjacent said distal end and having a diameter greater than that of the major portion of said bore and dimensioned with its base materially greater than its height thus to resist being axially upset in plunger reciprocation, the crest being compressed on insertion into that portion of the bore into an axially lengthened bearing portion, the remainder of said plunger being out of contact with said barrel.

3. A hypodermic syringe plunger having an axial cavity opening towards its proximal end, said plunger being of resiliently yieldable stock and tapering towards both of its ends to provide an annular ridge whose crest portion is adjacent said distal end, said cavity extending under said crest portion.

4. A hypodermic syringe comprising a barrel having a bore and a plunger reciprocable therein, said plunger being of resiliently yieldable stock, said plunger including an annular yieldably compressible integral seal of greater diameter than the major portion of the bore, the remainder of the barrel entering portion of said plunger being dimensioned to fit freely therein, said barrel bore tapering towards the distal end throughout the major portion of the length thereof.

5. A hypodermic syringe comprising a barrel having a bore and a plunger reciprocable therein, said plunger being of stock that is inherently yieldably resilient said plunger including an annular integral seal portion of greater diameter than the major portion of the bore, the remainder of the barrel entering portion of said plunger being dimensioned to fit freely therein, and a hollow chamber underlying the sealing portion of said plunger, the wall of said plunger defined by said chamber being sufficiently thin to be yieldable on mating engagement of said plunger and barrel.

References Cited in the file of this patent

UNITED STATES PATENTS

| 1,564,569 | Hein | Dec. 8, 1925 |
| 1,604,915 | Houser | Oct. 26, 1926 |
| 2,575,425 | Nelson | Nov. 20, 1951 |
| 2,619,087 | Oclassen et al. | Nov. 25, 1952 |
| 2,693,803 | Ogle | Nov. 9, 1954 |

FOREIGN PATENTS

| 578,827 | Great Britain | July 12, 1946 |